March 12, 1957  R. H. BRAUNLICH  2,784,843
FILTER CONSTRUCTION
Filed Aug. 10, 1954

United States Patent Office 2,784,843
Patented Mar. 12, 1957

2,784,843

FILTER CONSTRUCTION

Richard H. Braunlich, West Chester, Pa., assignor to American Viscose Corporation, Philadelphia, Pa., a corporation of Delaware Application August 10, 1954, Serial No. 448,871

20 Claims. (Cl. 210—164)

This invention relates to filters and, more particularly, to filters used in the spinning of artificial textile filaments. The conventional candle filter used between the spinning fluid pump and the spinneret on spinning machines, particularly viscose spinning machines, has proved to be disadvantageous because such a filter protects the jet only against large particles of dirt, large gels and skins which are dislodged periodically from equipment on the discharge side of the line filter. Gels smaller than 15 to 20 microns in diameter will generally pass through a candle filter, and, therefore, it is possible to greatly reduce the filter area. Gels are actually produced in the dead areas of the filter. A secondary cause of the production of gels in a candle filter resides in the fact that the viscose at first tends to flow through the bottom of the filter, thus leaving a comparatively stagnant area adjacent the top of the discharge end of the filter. In this stagnant area, coagulation occurs due to sharp bends in the flow of the liquid, relatively high temperatures, and the consequent reduction in flow rates. As the bottom or input end of the filter gradually clogs due to the natural filtering action of the viscose, the fluid flows in greater proportion through the upper end of the filter medium. This increased flow at the upper end dislodges the particles which have previously coagulated, thus forcing them through the filter and clogging the spinneret.

A further objection to the candle filter as customarily employed resides in the fact that it is nearly impossible to purge all the air from the filter with a viscose flow rate of approximately 10.5 grams per minute. Even after one or two hours of flushing, bubbles have still been found in the filter, and this condition is particularly prevalent at the base of the filter candle where flow velocities approach or attain zero. Air bubbles thus trapped in the filter are sometimes released over a twenty-four to forty-eight hour period when the filter position is changed for doffing or replacement of a jet. Sometimes bubbles are released when the filter is subjected to periodic vibrations. The release of the fine air bubbles seriously affects the quality of the product by causing breakage or reduced strength of filaments. A flushing period of six to eight hours prior to spinning is considered standard practice for a viscose flow rate of 2.8 grams per minute through the filter. Flow rates of such a low magnitude also lead to increased gel formation at the base of the candle with a corresponding decrease in yarn quality.

The prior art discloses various constructions which have been proposed to overcome this disadvantage, but these devices have not met with acceptance for various reasons. In considering the problem, it must be appreciated that the spinning solution, particularly for viscose rayon, is a relatively thick or viscous liquid (hence the name "viscose"), and the normal flow is quite slow compared to customary velocity of liquid flow through conduits. These factors, of course, are inherent and greatly accentuate the undesirable conditions found with the conventional candle filter as noted above.

The proposed filter construction eliminates dead spaces in the filter where the viscose may become stagnant and form gels. Furthermore, the invention provides uniform flow of liquid across the entire area of the filter medium. Both of these achievements are of prime importance. With my improved filter, it has been found possible to handle viscose at flow rates as low as 2 grams per minute without any of the above-mentioned disadvantages occurring. As a consequence, gel breeding zones of low velocity are eliminated, air bubbles are completely purged from the filter housing, and flushing time is reduced from several hours to a few minutes.

The primary object therefore of the present invention is to provide a filter construction for relatively low velocity viscous fluids which eliminates areas of relatively low or zero flow.

A further object of the invention is to provide a filter of the aforesaid type in which the flow of liquid across the filter medium is substantially uniform over the entire filter area.

A further object of the invention is to provide in a disc filter a suspended insert which channels the fluid flow to the periphery of the filter.

A further object of the invention is to provide, in a filter of the aforesaid type, means for supporting a fluid directing member in predetermined spaced relation to the filter medium.

Further objects will be apparent from the specification and drawings in which.

My improved filter comprises essentially the provision of a filter housing in which the usual filtering medium or disc is removably clamped. The two sections of the housing are recessed to provide a chamber which registers with the exposed area of the filter medium. This recess may be symmetrical on either side of the filter or, if desired, it may be asymmetrical giving a different chamber shape for the up-stream or down-stream side of the filter proper. In the preferred embodiment, the recess in the filter housing is conical and a conical element is supported in the recess so that it is, in effect, suspended in spaced relation from the walls of the chamber as well as with respect to the filter itself. The mounting of the element is achieved by means of magnets imbedded in one or both of the elements which may be used to mutually attract or repel each other. In addition, magnets may also be imbedded in the housing to cooperate with a magnet in the elements to maintain the element in proper position. While I have found that the use of magnets for holding the element or elements in position is preferred, the invention is not limited to such means since the elements can be supported satisfactorily by means of a sleeve in such a way that no stagnant or low velocity flow areas are created.

Figure 3:
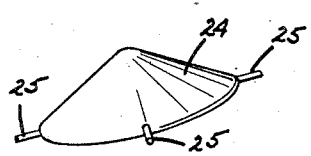
Figure 3 is a perspective of one of the conical inserts shown in Figure 1.
Figure 1:
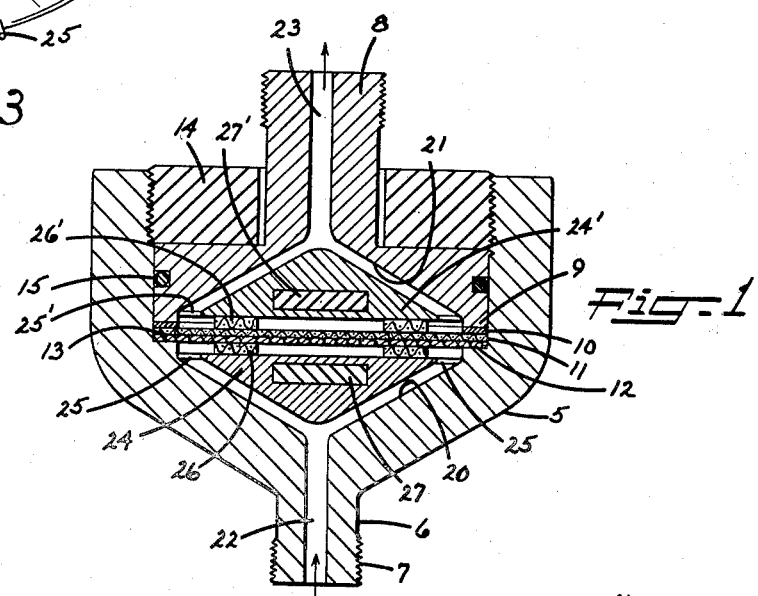
Figure 1 is a longitudinal section through a filter assembly constructed in accordance with the present invention.

Referring now more particularly to the drawings, the main filter housing 5 is provided with a hollow extension or nipple 6 to which an up-stream liquid conduit is attached by means of threads 7. Housing 5 is generally circular in shape and receives a cooperating housing member 8 which has an annular shoulder 9 capable of being clamped against a rubber washer 10 which bears against a screen 11 having an annular area around its periphery filled with a reinforcing plastic. The filter cloth 12 seats against an annular shoulder 13 in housing 5 and is held in place when the secondary housing member 8 is compressed against the washer, screen and cloth by means of a nut 14. A liquid tight seal between the housings 5 and 8 is provided by means of an O-ring 15. Both of the housings 5 and 8 are recessed at 20 and 21 respectively to provide a conical chamber in the housings. Liquid flows into chamber 20 through passage 22 and is discharged from chamber 21 through passage 23. In order to direct the flow of liquid to the peripheral area of filter 12, I partially fill the chamber 20 with a conical disc-like element or deflector 24 which is dimensioned to provide a substantially unobstructed liquid passage over the conical surface of the element. In the form of Figure 1, the element 24 is provided with a plurality of radially extending spacer projections 25, 25 which center the element in chamber 20. The ends of the projections 25, 25 provides a sliding fit in the large bore of chamber 20. A constant spacing between the filter 12 and the flat surface or base of element 24 may be provided by means of a spacing element or grid 26, if desired.

A second element or deflector 24', which in the form of Figure 1 is identical to element 24, is positioned in chamber 21 in the same manner as described in connection with element 24. Element 24' is provided with centering lugs or projections 25', 25' and, likewise, may be separated from the screen 11 by means of a second screen or grid 26'. As described, it will be understood that the thickness of grids 26, 26', washer 10, screen 11 and filter 12 are all critical depending upon the depth of the cylindrical portion of chambers 20 and 21 as well as the pressure which may be applied to nut 14. In order to overcome the necessity for critical dimensions and thicknesses of the parts referred to above, it is possible to eliminate the projections 25 and 25' and utilize instead a pair of magnets 27 and 27' which are imbedded in elements 24 and 24' respectively. By means of proper indexing marks on the elements, they may be rotationally positioned so that magnets 27 and 27' attract each other and hold the elements against grids 26 and 26' so that the elements have no mechanical contact with either of the housings. An alternative construction is to dispense with the grids 26 and 26' but to turn one of the elements 180° so that like poles are opposite each other, thus causing the magnets to act in repulsion so that the elements 24 and 24' are securely positioned in chambers 20 and 20' by means of the projections 25 and 25'. This latter expedient may not be feasible with relatively high pressures on the upstream side.

Figures 2, 4:
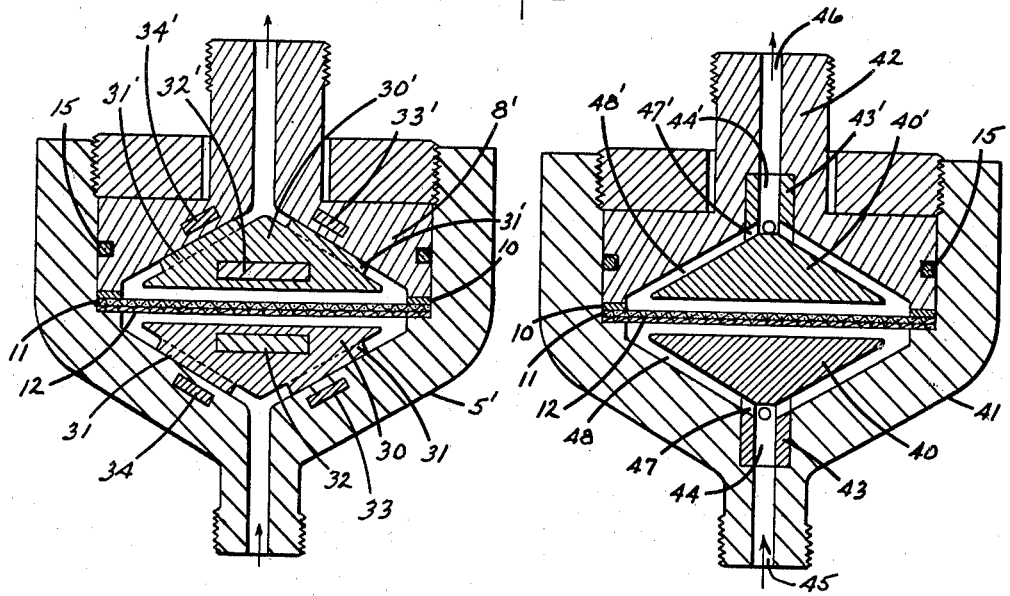
Figure 2 is a view similar to Figure 1 showing a modified form of the invention.
Figure 4 is a view similar to Figures 1 and 2 of a further embodiment of the invention.

Figure 2 illustrates a still further variation in which the elements 30 and 30' are provided with a plurality of narrow ribs 31 and 31' respectively which, in effect, replace the lugs 25 and 25' employed with the elements in Figure 1. In the form of Figure 2 the elements 30 and 30' are retained in position entirely by means of magnets 32 and 32' imbedded in the elements. Likewise, the magnets 32 and 32' may be indexed with respect to each other so that the magnets repel each other, thus holding the elements effectively in position for low pressure operation. By employing other magnets 33 and 34 imbedded in housing 5', it is possible to retain element 30 securely in its proper position by means of the attraction between magnet 32 and magnets 33 and 34. To avoid any reason for indexing magnet 32, magnets 33 and 34 may be replaced by means of an annular iron ring imbedded in the housing 5'. The same procedure is employed in connection with housing 8' and magnets 33' and 34'.

In the construction of Figure 4, I avoid the use of magnets by mounting the conical fluid directing elements 40 and 40' in housings 41 and 42 by means of hollow supports 43 and 43' on each element respectively. These supports are preferably formed integrally with the element and have a press fit in the housings 41 and 42 respectively. The supports have bores 44 and 44' which are of the same diameter and communicate with passages 45 and 46. A series of radial slots or holes 47 and 47' at the base of the supports provide fluid communication between the passages 45, 46 and chambers 48, 48' respectively. It will be apparent that the structure of Figure 4 may be utilized with grids similar to 26 and 26' of Figure 1, if desired. The necessity for such grids will depend in part upon the tightness of the fit of the element supports in the housings and the velocity and pressure of the fluid on the up-stream side of the filter.

It will be understood that the present filter construction, whether employing a magnetic mounting for the filter element or a mechanical mounting, provides unobstructed fluid flow to the periphery of the filter and equally around all parts of the periphery. A particular important feature resides in the fact that maximum flow occurs in an area that would otherwise be stagnant. The clearance between the elements and the housings is so dimensioned that there will be uniform liquid flow over the entire filter area so that there is no possibility for viscose to coagulate in stagnant areas. The filter is simple, easy to assemble and clean.

Having thus described my invention, I claim:

1. A fluid filter assembly comprising a housing having an inlet and outlet opening, a filter supported in said housing between said inlet and outlet openings and adapted to intercept the fluid passing therebetween, said housing having an internal face defining a substantially conical chamber on at least one side of the filter and communicating with one of said openings, a conical deflector positioned within said chamber with its base adjacent to said filter, and means for supporting the conical deflector in said chamber with its side in spaced relationship with the wall of the chamber to provide a restricted fluid passage therebetween and with the base of the conical deflector being spaced from said filter to permit fluid flow therebetween and across the filter.

2. Apparatus in accordance with claim 1 in which the supporting means comprises a grid between the base of the deflector and the filter.

3. Apparatus in accordance with claim 1 in which the supporting means comprises a plurality of prongs radially spaced around the periphery of the deflector.

4. Apparatus in accordance with claim 3 having a grid between the filter and the base of the deflector.

5. Apparatus in accordance with claim 1 in which the supporting means comprises a magnet.

6. Apparatus in accordance with claim 1 in which the supporting means comprises a magnet in the deflector.

7. Apparatus in accordance with claim 1 having a metallic member in the housing, a magnet in the deflector, and a spacer rib on the sides of the deflector to maintain the deflector in spaced relation with the walls of the chamber.

8. Apparatus in accordance with claim 1 in which the means comprises a hollow post attached to the apex of the deflector and mounted in the housing.

9. Apparatus in accordance with claim 1 wherein said deflector is positioned between said filter and said inlet opening.

10. Apparatus in accordance with claim 1 wherein said deflector is positioned between said filter and said outlet opening.

11. A filter assembly for viscose and the like comprising a housing, a filter supported in said housing, walls defining a substantially conical chamber in the housing on one side of the filter, walls in the housing defining a fluid passage terminating substantially at the apex of said chamber, a complementary element removable from the housing for clamping the filter in the housing, means for securing said element in the housing, walls defining a complementary conical chamber in the element on the opposite side of the filter, walls in the element defining a fluid passage terminating at the apex of the chamber in the element, and a substantially conical deflector supported in each of the chambers in spaced relation to the filter and the walls of the chambers.

12. Apparatus in accordance with claim 11 having a circular flat filter.

13. Apparatus in accordance with claim 11 having means for supporting each of the deflectors in their respective chambers.

14. Apparatus in accordance with claim 11 in which the supporting means comprises a grid between the bases of the deflectors and the filter.

15. Apparatus in accordance with claim 11 in which the supporting means comprises a plurality of prongs radially spaced around the periphery of each deflector.

16. Apparatus in accordance with claim 15 having a grid between the filter and the base of each deflector.

17. Apparatus in accordance with claim 11 in which the supporting means comprises a magnet in each deflector.

18. Apparatus in accordance with claim 11 having a metallic member in the housing, a metallic member in the complementary element, a magnet in each deflector, and spacer ribs on the sides of each deflector to maintain said deflectors in spaced relation with the walls of the chambers in the housing and the complementary element.

19. Apparatus as defined in claim 18 wherein said metallic members in said housing and said complementary element are magnets.

20. Apparatus in accordance with claim 11 in which the means comprises a hollow post attached to the apex of each deflector and mounted in the housing and complementary element respectively.

References Cited in the file of this patent

UNITED STATES PATENTS

| | | |
|---|---|---|
| 545,125 | Grist | Aug. 27, 1895 |
| 691,706 | Long | Jan. 21, 1902 |
| 776,227 | Edson | Nov. 29, 1904 |
| 1,458,464 | Byers | June 12, 1923 |
| 1,461,687 | Strobel | July 10, 1923 |
| 1,685,775 | Dreaper | Oct. 2, 1928 |
| 2,603,356 | Hisey | July 15, 1952 |
| 2,617,147 | McDermott | Nov. 11, 1952 |

FOREIGN PATENTS

| | | |
|---|---|---|
| 293,816 | Great Britain | July 12, 1928 |
| 606,463 | Germany | Dec. 3, 1934 |
| 667,933 | Great Britain | Mar. 12, 1952 |